US012785340B2

(12) United States Patent
Lee

(10) Patent No.: US 12,785,340 B2
(45) Date of Patent: Nov. 3, 2026

(54) JACK CONNECTION-TYPE ELECTRICAL CONNECTOR WITH LEAKAGE CURRENT RESTRICTION FUNCTION

(71) Applicant: VISION TECH Corporation, Busan (KR)

(72) Inventor: Jin Sung Lee, Busan (KR)

(73) Assignee: VISION TECH Corporation, Busan (KR)

( * ) Notice: Subject to any disclaimer, the term of this patent is extended or adjusted under 35 U.S.C. 154(b) by 262 days.

(21) Appl. No.: 18/641,958

(22) Filed: Apr. 22, 2024

(65) Prior Publication Data

US 2025/0105566 A1 Mar. 27, 2025

(30) Foreign Application Priority Data

Sep. 27, 2023 (KR) ........................ 10-2023-0130672

(51) Int. Cl.
*H01R 24/58* (2011.01)

(52) U.S. Cl.
CPC .................................... *H01R 24/58* (2013.01)

(58) Field of Classification Search
CPC .... H01R 24/58; H01R 13/6666; H01R 31/02; H01R 2103/00; H01R 24/38; H01R 13/648
See application file for complete search history.

(56) References Cited

U.S. PATENT DOCUMENTS 6,422,884 B1 * 7/2002 Babasick ........... H01R 13/5812 439/470
6,945,805 B1 * 9/2005 Bollinger ............... H01R 39/64 439/348
8,616,909 B2 * 12/2013 Kurumizawa .......... E05B 83/00 439/304
8,905,790 B2 * 12/2014 Staudigel ............... H01R 13/50 439/607.05
12,651,152 B2 * 6/2026 Kovshov ................ G06N 3/065
2008/0188109 A1 * 8/2008 Hawkins ................ H01R 31/06 439/287
2013/0210252 A1 * 8/2013 Ilyes .................... H01R 33/945 439/226
2013/0210292 A1 * 8/2013 Schmidt ................... H01R 4/06 439/775

(Continued)

FOREIGN PATENT DOCUMENTS

KR 10-1404806 B1 6/2014
KR 10-1532711 B1 7/2015

(Continued)

OTHER PUBLICATIONS

Non-final Office Action dated Nov. 11, 2024 mailed from the Korean Patent Office for Korean Application No. 10-2023-0130672.

(Continued)

*Primary Examiner* — Truc T Nguyen
(74) *Attorney, Agent, or Firm* — Lex IP Meister, PLLC

(57) ABSTRACT

Disclosed is a jack connection-type electrical connector with a leakage current restriction function implemented to restrict leakage current by increasing the area of a neutral line terminal of the electrical connector for branching power supplied from a power system to a load, so as to prevent electrical shock accidents.

5 Claims, 5 Drawing Sheets

(56) References Cited

U.S. PATENT DOCUMENTS

| | | | | |
|---|---|---|---|---|
| 2014/0127926 | A1* | 5/2014 | Condo | H01R 13/6456 439/345 |
| 2015/0099379 | A1* | 4/2015 | Borden | H01R 13/44 439/147 |
| 2015/0244113 | A1* | 8/2015 | Okada | H01R 13/73 439/575 |
| 2016/0114691 | A1* | 4/2016 | Sobu | B60L 3/0069 439/620.21 |
| 2023/0283018 | A1* | 9/2023 | Hsu | H01R 13/111 439/660 |
| 2023/0321557 | A1 | 10/2023 | Cho | |

FOREIGN PATENT DOCUMENTS

| | | | |
|---|---|---|---|
| KR | 10-2016-0046422 | A | 4/2016 |
| KR | 10-1625493 | B1 | 5/2016 |
| KR | 10-1956664 | B1 | 3/2019 |
| KR | 10-2019-0045692 | A | 5/2019 |
| KR | 10-2022-0026196 | A | 3/2022 |
| KR | 102800834 | B1 | 4/2025 |

OTHER PUBLICATIONS

Notice of Allowance mailed Apr. 21, 2025 from Korean Patent Office for Korean Application No. 10-2023-0130672.

Office Action mailed on Sep. 11, 2026 from the Vietnamese Patent Office for Vietnamese Application No. 1-2024-02906 and its English translation.

* cited by examiner

JACK CONNECTION-TYPE ELECTRICAL CONNECTOR WITH LEAKAGE CURRENT RESTRICTION FUNCTION

BACKGROUND OF THE INVENTION

Field of the Invention

The present invention relates to an electrical connector for branching power supplied from a power system to a load, and more particularly, to a jack connection-type electrical connector with a leakage current restriction function.

Description of the Related Art

An electrical connector for branching power applied from a power system to a load may be used to connect sub-breakers to a main breaker of a distribution board. However, because the conventional electrical connector does not have a function of restricting leakage current, there was a problem of occurrence of an electrical shock accident when the electrical connector in which leakage current occurred was flooded.

Korean Patent Registration No. 10-1404806 (Registration Date: May 30, 2014), which was previously filed by the applicant of the present invention, discloses a circuit breaker having an electrical shock prevention function, in which a flat conductor with a greater cross-sectional area than the cross-sectional area of a wire is connected to an output terminal connected to a transmission and distribution path of electrical equipment so as to reduce current flowing in the human body coming into leakage current to prevent electrical shock.

This technology prevents electrical shock by restricting leakage current using a difference in area between conductor electrodes, and the present inventor(s) have conducted research and development on an electrical connector without the risk of electrical shock by applying this technology of restricting leakage current using the difference in area between the conductor electrodes to an electrical connector for branching power applied from a power system to a load.

RELATED ART DOCUMENTS

Patent Documents

Korean Patent Registration No. 10-1404806 (Registration Date: May 30, 2014)

SUMMARY OF THE INVENTION

Therefore, the present invention has been made in view of the above problems, and it is an object of the present invention to provide a jack connection-type electrical connector with a leakage current restriction function, which may restrict leakage current by increasing the area of a neutral line terminal of the electrical connector for branching power supplied from a power system to a load.

In accordance with the present invention, the above and other objects can be accomplished by the provision of a jack connection-type electrical connector with a leakage current restriction function, including a housing with an intersecting structure having one power input path and at least one power output path configured to intersect the power input path, a jack plug installed at an end of the power input path of the housing with the intersecting structure, and connected to a jack outlet of a power system to receive power from the power system, and at least one jack outlet installed at the at least one power output path of the housing with the intersecting structure, and configured such that a jack plug of a load is connected thereto to branch the power to the load, wherein the jack plug includes an input-side cylindrical phase voltage line terminal electrically connected to a cylindrical phase voltage line terminal of the jack outlet of the power system, and an input-side cylindrical neutral line terminal electrically connected to a cylindrical neutral line terminal of the jack outlet of the power system, and implemented to surround the input-side cylindrical phase voltage line terminal from outside to have a greater surface area than a surface area of the input-side cylindrical phase voltage line terminal so as to restrict leakage current.

The at least one jack outlet may include an output-side cylindrical phase voltage line terminal electrically connected to a cylindrical phase voltage line terminal of the jack plug of the load, and an output-side cylindrical neutral line terminal electrically connected to a cylindrical neutral line terminal of the jack plug of the load, and implemented to surround the output-side cylindrical phase voltage line terminal from outside to have a greater surface area than a surface area of the output-side cylindrical phase voltage line terminal so as to restrict leakage current.

The jack connection-type electrical connector may further include a phase voltage line terminal lead wire configured to electrically connect the input-side cylindrical phase voltage line terminal and the output-side cylindrical phase voltage line terminal, and a neutral line terminal lead wire configured to electrically connect the input-side cylindrical neutral line terminal and the output-side cylindrical neutral line terminal.

The housing with the intersecting structure may have the leakage current restriction function in which the at least one power output path is formed on one side or both sides in a direction perpendicular to the power input path so that the power input path and the at least one power output path intersect each other.

Another power output path may be formed in a direction parallel to the power input path in the housing with the intersecting structure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
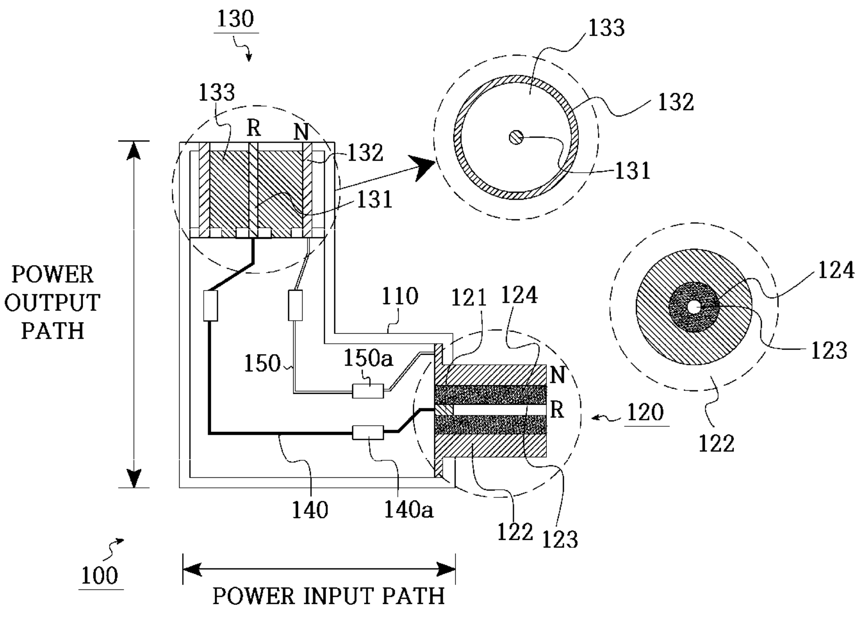
FIG. 1 is a cross-sectional view showing the configuration of a jack connection-type electrical connector with a leakage current restriction function according to a first embodiment of the present invention.

Hereinafter, the present invention will be described in detail through various embodiments with reference to the accompanying drawings to make the description of the present invention thorough and to fully convey the scope of the present invention to those skilled in the art. Although specific embodiments are illustrated in the drawings and the detailed description related thereto will be described, this is not intended to limit various embodiments of the present invention to any specific form.

In the following description of the present invention, a detailed description of known functions and configurations incorporated herein will be omitted when it may make the subject matter of the present invention rather unclear.

When an element or layer is referred to as being "on," "engaged with," "connected to," or "coupled to" another element or layer, it may be directly on, engaged with, connected to or coupled to the other element or layer, or intervening elements or layers may be present.

In contrast, when an element is referred to as being "directly on," "directly engaged with," "directly connected to," or "directly coupled to" another element or layer, there may be no intervening elements or layers present.

FIGS. 1 to 5 are cross-sectional views showing the configurations of jack connection-type electrical connectors with a leakage current restriction function according to first to fifth embodiments of the present invention. As shown in FIGS. 1 to 5, a jack connection-type electrical connector 100 with the leakage current restriction function according to the present invention includes a housing 110 with an intersecting structure, one jack plug 120, and at least one jack outlet 130.

The housing 110 with the intersecting structure is formed of an insulating material, such as plastic, to protect the inside of the housing 110 from the outside, and has one power input path and at least one power output path which intersects the power input path.

For example, the housing 110 with the intersecting structure may be implemented such that at least one power output path is formed on one side or both sides in a direction perpendicular to the power input path, and thus, the power input path and the at least one power output path intersect each other. Further, the housing 110 with the intersecting structure may be implemented such that another power output path is further formed in a direction parallel to the power input path.

In the jack connection-type connector 100 with the leakage current restriction function shown in FIG. 1, the hosing 110 with the intersecting structure is implemented in an 'L' shape, and it may be seen that one power output path is formed on one side in a direction perpendicular to the power input path so that the power input path and the power output path intersect each other.

Figure 2:
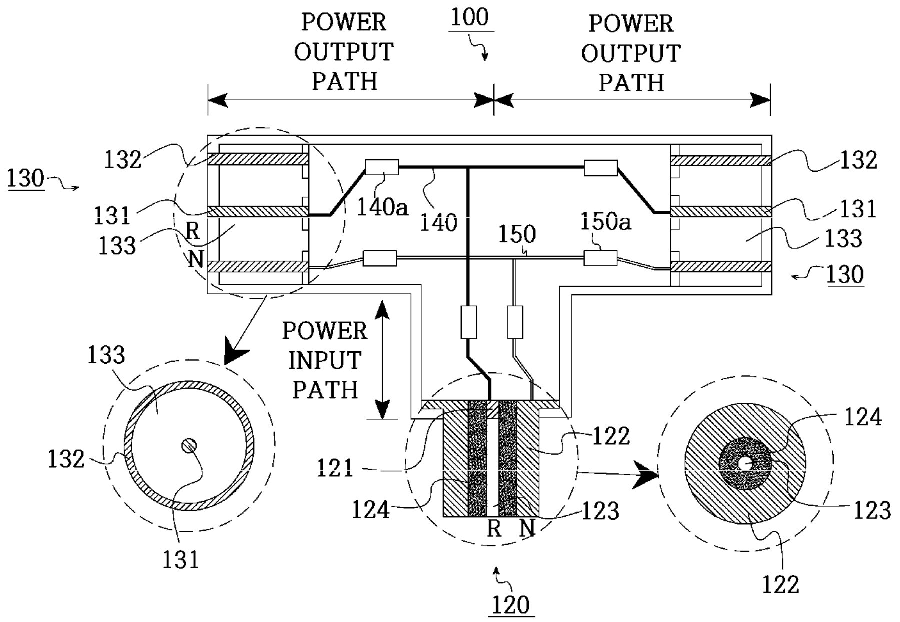
FIG. 2 is a cross-sectional view showing the configuration of a jack connection-type electrical connector with a leakage current restriction function according to a second embodiment of the present invention.

In the jack connection-type connector 100 with the leakage current restriction function shown in FIG. 2, the hosing 110 with the intersecting structure is implemented in a 'T' shape, and it may be seen that two power output paths are formed on both sides in a direction perpendicular to the power input path so that the power input path and the power output paths intersect each other.

Figure 3:
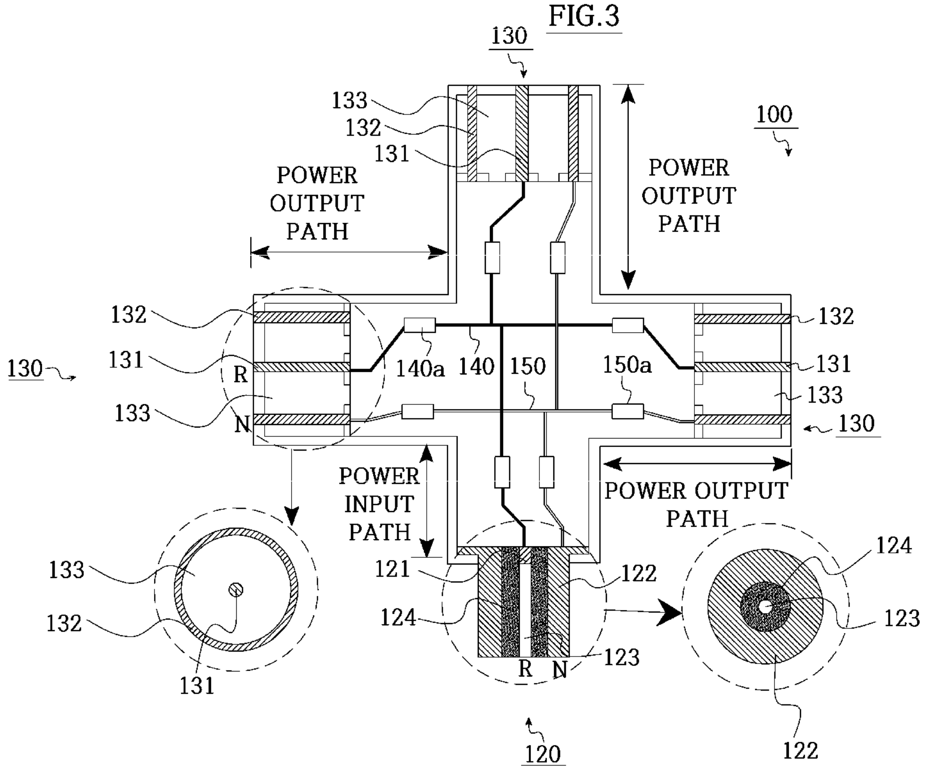
FIG. 3 is a cross-sectional view showing the configuration of a jack connection-type electrical connector with a leakage current restriction function according to a third embodiment of the present invention.

In the jack connection-type connector 100 with the leakage current restriction function shown in FIG. 3, the hosing 110 with the intersecting structure is implemented in a '+' shape, and it may be seen that two power output paths are formed on both sides in a direction perpendicular to the power input path and one power output path is formed in a direction parallel to the power input path so that the power input path and the power output paths intersect each other.

Figure 4:
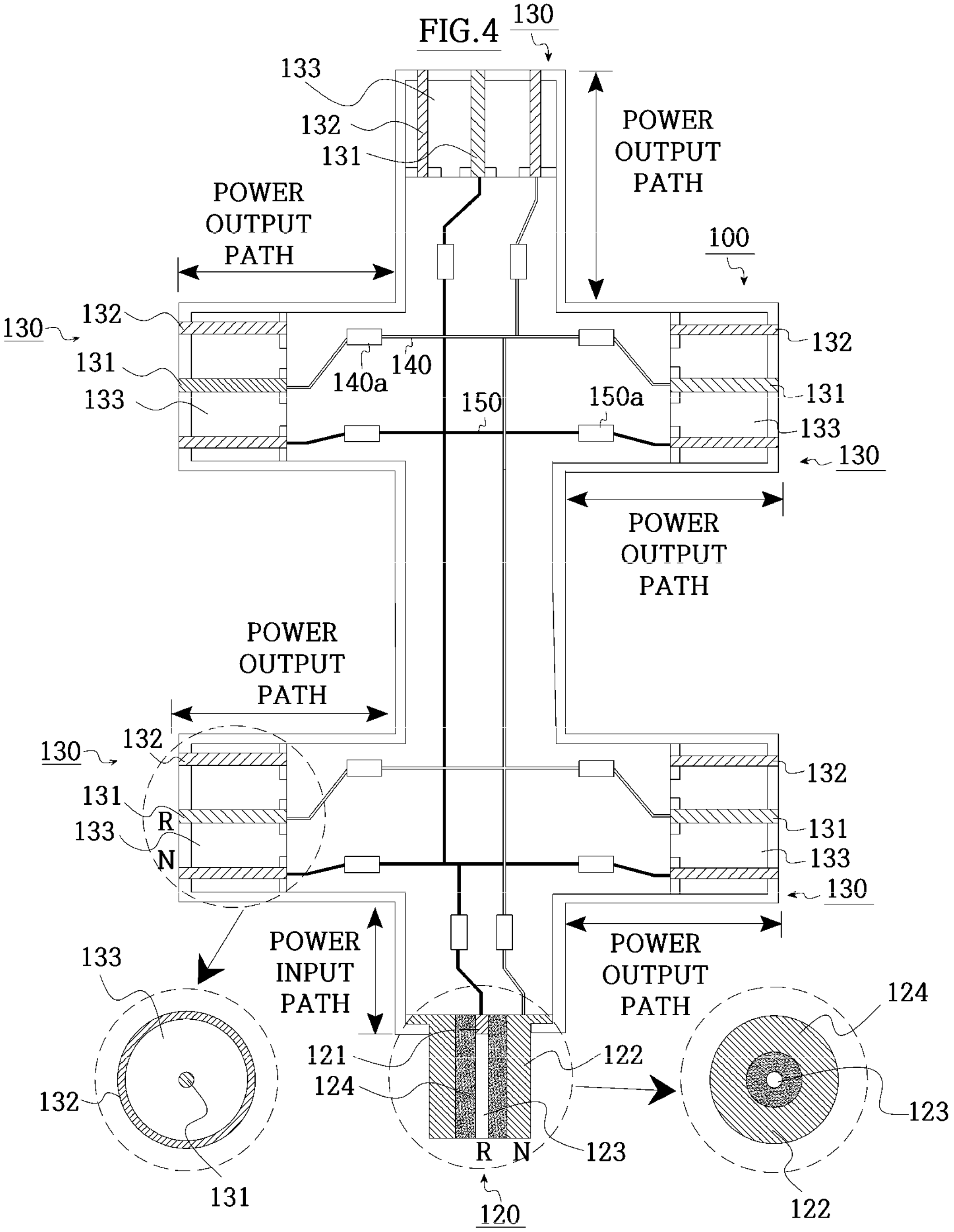
FIG. 4 is a cross-sectional view showing the configuration of a jack connection-type electrical connector with a leakage current restriction function according to a fourth embodiment of the present invention.

In the jack connection-type connector 100 with the leakage current restriction function shown in FIG. 4, the hosing 110 with the intersecting structure is implemented in a shape into which two '+' shapes are combined, and it may be seen that four power output paths are formed on both sides in a direction perpendicular to the power input path and one power output path is formed in a direction parallel to the power input path so that the power input path and the power output paths intersect each other.

Figure 5:
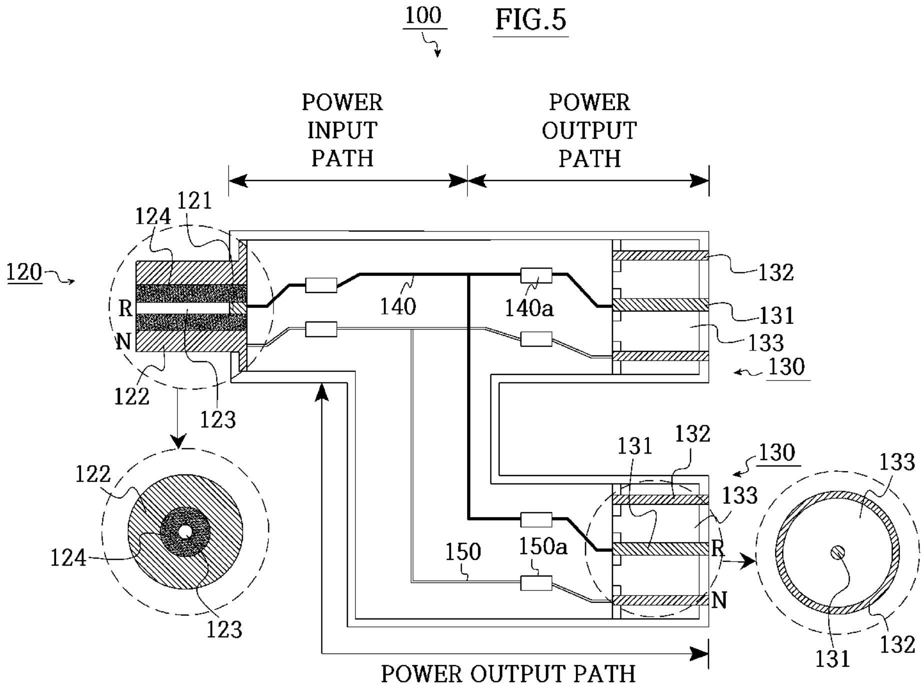
FIG. 5 is a cross-sectional view showing the configuration of a jack connection-type electrical connector with a leakage current restriction function according to a fifth embodiment of the present invention.

In the jack connection-type connector 100 with the leakage current restriction function shown in FIG. 5, the hosing 110 with the intersecting structure is implemented in a 'т' shape, and it may be seen that one power output path is formed in a direction parallel to the power input path and one power output path is formed in a direction perpendicular to the power input path and then formed in a direction parallel to the power input path so that the power input path and the power output paths intersect each other.

The jack plug 120 is installed at the end of the power input path of the housing 110 with the intersecting structure, and is connected to a jack outlet (not shown) of a power system to receive power from the power system. Here, the jack outlet of the power system has the same structure as the jack outlet 130.

The jack outlet 130 is installed at the end of the power output path of the housing 110 and, when a jack plug (not shown) of a load is connected to the jack outlet 130, the jack outlet 130 branches power to the load. Here, the jack plug of the load has the same structure as the jack plug 120 of the present invention.

In the jack connection-type electrical connector 100 with the leakage current restriction function according to the present invention, the jack plug 120 includes an input-side cylindrical phase voltage line terminal 121 and an input-side cylindrical neutral line terminal 122 in order to restrict leakage current on a power input side.

The input-side cylindrical phase voltage line terminal 121 may be formed of a conductive metal or alloy material, and may be electrically connected to a cylindrical phase voltage line terminal of the jack outlet of the power system.

The input-side cylindrical neutral line terminal 122 may be formed of a conductive metal or alloy material, and may be implemented to surround the input-side cylindrical phase voltage line terminal 121 from the outside and to have a greater length than the length of the input-side cylindrical phase voltage line terminal 121 while forming a hollow 123 therebetween.

When the jack plug 120 is connected to the jack outlet (not shown) of the power system, the cylindrical phase voltage line terminal of the jack outlet of the power system is inserted into the hollow 123 and comes into contact with the input-side cylindrical phase voltage line terminal 121, and the outer circumferential surface of the input-side cylindrical neutral line terminal 122 comes into contact with the inner circumferential surface of a cylindrical neutral line terminal of the jack outlet of the power system.

In addition, a cylindrical insulator 124 may be disposed between the input-side cylindrical neutral line terminal 122 and the input-side cylindrical phase voltage line terminal 121 to insulate the input-side cylindrical neutral line terminal 122 and the input-side cylindrical phase voltage line terminal 121 from each other.

At this time, the input-side cylindrical neutral line terminal 122 is electrically connected to the cylindrical neutral line terminal of the jack outlet of the power system, and is implemented to surround the input-side cylindrical phase voltage line terminal 121 from the outside to have a greater surface area than the surface area of the input-side cylindrical phase voltage line terminal 121 so as to restrict leakage current The reason for this is that, as described in Korean Patent Registration No. 10-1404806 (Registration Date: May 30, 2014) stated in the related art section, as the area of a conductor connected to the negative (−) terminal of a power supply (corresponding to the input-side cylindrical neutral line terminal of the present invention) increases compared to a conductor connected to the positive (+) terminal of the power supply (corresponding to the input-side cylindrical phase voltage line terminal of the present invention, leakage current gradually decreases.

Specifically, when the jack connection-type electrical connector 100 with the leakage current restriction function according to the present invention is flooded and current leaks through the input-side cylindrical phase voltage line terminal 121, leakage current flows through the input-side cylindrical phase voltage line terminal 121→water→the input-side cylindrical neutral line terminal 122→the cylindrical neutral line terminal of the jack outlet of the power system→the neural line N of the power system.

In this process, current leaking into water through the input-side cylindrical phase voltage line terminal 121 does not flow to the human body having a relatively high resistance, but flows to the input-side cylindrical neutral line terminal 122 through water and enters the neutral line N of the power system through the cylindrical neutral line terminal of the jack outlet of the power system, thereby restricting the leakage current so as not to flow to the human body and minimizing the risk of electrical shock of the human body.

Through the above implementation, the present invention may restrict leakage current on the input side of the jack connection-type electrical connector 100 by increasing the area of the input-side cylindrical neutral line terminal 122 of the jack connection-type electrical connector 100 for branching power applied from the power system to the load, thereby being capable of preventing the risk of electrical shock.

In addition, in the jack connection-type electrical connector 100 with the leakage current restriction function according to the present invention, the jack outlet 130 includes an output-side cylindrical phase voltage line terminal 131 and an output-side cylindrical neutral line terminal 132 in order to restrict leakage current on a power output side.

The output-side cylindrical phase voltage line terminal 131 may be formed of a conductive metal or alloy material, and may be electrically connected to a cylindrical phase voltage line terminal of the jack plug of the load.

The output-side cylindrical neutral line terminal 132 may be formed of a conductive metal or alloy material, and may be implemented to surround the output-side cylindrical phase voltage line terminal 131 from the outside and to have the same length as the length of the output-side cylindrical phase voltage line terminal 131 while forming a hollow 133 therebetween.

When the jack plug of the load is connected to the jack outlet 130, a cylindrical neutral line terminal of the load is inserted into the hollow 133, the outer circumferential surface of the cylindrical neutral line terminal of the jack plug of the load comes into contact with the inner circumferential surface of the output-side cylindrical neutral line terminal 132 of the jack outlet 130, and the output-side cylindrical phase voltage line terminal 131 of the jack outlet 130 comes into contact with the cylindrical phase voltage line terminal of the jack plug of the load.

At this time, the output-side cylindrical neutral line terminal 132 is electrically connected to the cylindrical neutral line terminal of the jack plug of the load, and is implemented to surround the output-side cylindrical phase voltage line terminal 131 from the outside to have a greater surface area than the surface area of the output-side cylindrical phase voltage line terminal 131 so as to restrict leakage current.

The reason for this is that, as described in Korean Patent Registration No. 10-1404806 (Registration Date: May 30, 2014) stated in the related art section, as the area of a conductor connected to the negative (−) terminal of a power supply (corresponding to the output-side cylindrical neutral line terminal of the present invention) increases compared to a conductor connected to the positive (+) terminal of the power supply (corresponding to the output-side cylindrical phase voltage line terminal of the present invention, leakage current gradually decreases.

Specifically, when the jack connection-type electrical connector 100 with the leakage current restriction function according to the present invention is flooded and current leaks through the output-side cylindrical phase voltage line terminal 131, leakage current flows through the output-side cylindrical phase voltage line terminal 131→water→the output-side cylindrical neutral line terminal 132→the cylindrical neutral line terminal of the jack plug of the load→the neural line N of the load.

In this process, current leaking into water through the output-side cylindrical phase voltage line terminal 131 does not flow to the human body having a relatively high resistance, but flows to the output-side cylindrical neutral line terminal 132 through water and enters the neutral line N of the load through the cylindrical neutral line terminal of the jack plug of the load, thereby restricting the leakage current so as not to flow to the human body and minimizing the risk of electrical shock of the human body.

Through the above implementation, the present invention may restrict leakage current on the output side of the jack connection-type electrical connector 100 by increasing the area of the output-side cylindrical neutral line terminal 132 of the jack connection-type electrical connector 100 for branching power applied from the power system to the load, thereby being capable of preventing electrical shock accidents.

Meanwhile, according to an additional aspect of the present invention, the jack connection-type electrical connector 100 with the leakage current restriction function may further include a phase voltage line terminal lead wire 140, and a neutral line terminal lead wire 150.

The phase voltage line terminal lead wire 140 electrically connects the input-side cylindrical phase voltage line terminal 121 and the output-side cylindrical phase voltage line terminal 131. Here, conductors 140*a* may be disposed in the middle of the phase voltage line terminal lead wire 140, and the length of the phase voltage line terminal lead wire 140 may be appropriately adjusted so as not to be too long by connecting respective wires by soldering using the conductors 140*a*.

The neutral line terminal lead wire 150 electrically connects the input-side cylindrical neutral line terminal 122 and the output-side cylindrical neutral line terminal 132. Here, conductors 150*a* may be disposed in the middle of the neural line terminal lead wire 150, and the length of the neutral line terminal lead wire 150 may be appropriately adjusted so as not to be too long by connecting respective wires by soldering using the conductors 150*a*.

Through the above implementation, the present invention may electrically connect the power input side and the branch power output side of the jack connection-type electrical connector 100 with the leakage current restriction function through the phase voltage line terminal lead wire 140 and the neutral line terminal lead wire 150.

As described above, the present invention may restrict leakage current by increasing the area of the neutral line terminal of the electrical connector for branching power supplied from the power system to the load, thereby being capable of preventing electrical shock accidents.

As is apparent from the above description, a jack connection-type electrical connector with a leakage current restriction function according to the present invention provides may restrict leakage current by increasing the area of a neutral line terminal of the electrical connector for branching power supplied from a power system to a load, thereby being capable of preventing electrical shock accidents.

The present invention is industrially usable in the technical field related to an electrical connector for branching power applied from a power system to a load and in the field of application technology thereof.

The various embodiments disclosed in this specification and drawings are merely presented as specific examples to aid understanding, and are not intended to limit the scope of the various embodiments of the present invention.

Therefore, although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A jack connection-type electrical connector with a leakage current restriction function, comprising:

a housing with an intersecting structure having one power input path and at least one power output path configured to intersect the power input path;

a jack plug installed at an end of the power input path of the housing with the intersecting structure, and connected to a jack outlet of a power system to receive power from the power system; and at least one jack outlet installed at the at least one power output path of the housing with the intersecting structure, and configured such that a jack plug of a load is connected thereto to branch the power to the load, wherein the jack plug comprises:

an input-side cylindrical phase voltage line terminal electrically connected to a cylindrical phase voltage line terminal of the jack outlet of the power system; and an input-side cylindrical neutral line terminal electrically connected to a cylindrical neutral line terminal of the jack outlet of the power system, and implemented to surround the input-side cylindrical phase voltage line terminal from outside to have a greater surface area than a surface area of the input-side cylindrical phase voltage line terminal so as to restrict leakage current.

2. The jack connection-type electrical connector according to claim 1, wherein the at least one jack outlet comprises:

an output-side cylindrical phase voltage line terminal electrically connected to a cylindrical phase voltage line terminal of the jack plug of the load; and an output-side cylindrical neutral line terminal electrically connected to a cylindrical neutral line terminal of the jack plug of the load, and implemented to surround the output-side cylindrical phase voltage line terminal from outside to have a greater surface area than a surface area of the output-side cylindrical phase voltage line terminal so as to restrict leakage current.

3. The jack connection-type electrical connector according to claim 2, further comprising:

a phase voltage line terminal lead wire configured to electrically connect the input-side cylindrical phase voltage line terminal and the output-side cylindrical phase voltage line terminal; and a neutral line terminal lead wire configured to electrically connect the input-side cylindrical neutral line terminal and the output-side cylindrical neutral line terminal.

4. The jack connection-type electrical connector according to claim 1, wherein the housing with the intersecting structure has the leakage current restriction function in which the at least one power output path is formed on one side or both sides in a direction perpendicular to the power input path so that the power input path and the at least one power output path intersect each other.

5. The jack connection-type electrical connector according to claim 4, wherein another power output path is formed in a direction parallel to the power input path in the housing with the intersecting structure.

* * * * *